US012791785B2

(12) United States Patent
Kondo et al.

(10) Patent No.: US 12,791,785 B2
(45) **Date of Patent: *Nov. 10, 2026**

(54) COMPOSITE SUBSTRATE FOR PHOTONIC CRYSTAL ELEMENT, AND PHOTONIC CRYSTAL ELEMENT

(71) Applicant: NGK Insulators, Ltd., Nagoya-City (JP)

(72) Inventors: Jungo Kondo, Miyoshi-City (JP); Keiichiro Asai, Nagoya-City (JP); Tomoyoshi Tai, Inazawa-City (JP)

(73) Assignee: NGK INSULATORS, LTD., Nagoya-City (JP)

( * ) Notice: Subject to any disclaimer, the term of this patent is extended or adjusted under 35 U.S.C. 154(b) by 150 days.

This patent is subject to a terminal disclaimer.

(21) Appl. No.: 18/047,701

(22) Filed: Oct. 19, 2022

(65) Prior Publication Data

US 2023/0061055 A1 Mar. 2, 2023

Related U.S. Application Data

(63) Continuation of application No. PCT/JP2021/019007, filed on May 19, 2021.

(30) Foreign Application Priority Data

May 28, 2020 (JP) ................................ 2020-092825

(51) Int. Cl.
*G02B 6/12* (2006.01)
*G02B 6/122* (2006.01)

(52) U.S. Cl.
CPC .... *G02B 6/122* (2013.01); *G02B 2006/12083* (2013.01)

(58) Field of Classification Search
CPC ........ G02B 6/1225; G02B 6/293; G02B 6/32; G02B 6/34; G02B 2006/12047; G02B 5/18; G02F 1/295
See application file for complete search history.

(56) References Cited

U.S. PATENT DOCUMENTS 6,683,898 B2 * 1/2004 Østergaard .......... H01S 5/18355 372/43.01
7,242,839 B2 7/2007 Sakai et al.
(Continued)

FOREIGN PATENT DOCUMENTS

JP 2005-274840 A 10/2005
JP 2006-276576 A 10/2006
(Continued)

OTHER PUBLICATIONS

Venancio Calero, et al., "Toward Highly Reliable, Precise, and Reproducible Fabrication of Photoic Crystal Slabs on Lithium Niobate," *Journal of Lightwave Technology*, vol. 37, No. 3, Feb. 1, 2019, pp. 698-703 (6 pages).
(Continued)

*Primary Examiner* — Eric Wong
(74) *Attorney, Agent, or Firm* — Muncy, Geissler, Olds & Lowe, P.C.

(57) ABSTRACT

A composite substrate (100) for a photonic crystal element includes: an electro-optical crystal substrate (10) having an electro-optical effect; an optical loss-suppressing and cavity-processing layer (20) arranged on one surface of the electro-optical crystal substrate (10); and a support substrate (30) integrated with the electro-optical crystal substrate (10) through the optical loss-suppressing and cavity-processing layer (20).

14 Claims, 8 Drawing Sheets

(56) References Cited

U.S. PATENT DOCUMENTS

| | | | |
|---|---|---|---|
| 7,532,777 B2 | 5/2009 | Mitomi et al. | |
| 8,002,998 B2 | 8/2011 | Iwata et al. | |
| 9,239,424 B2 * | 1/2016 | Czornomaz | G02B 6/1225 |
| 11,281,032 B2 | 3/2022 | Tai et al. | |
| 11,573,435 B2 | 2/2023 | Tai et al. | |
| 12,436,336 B2 * | 10/2025 | Kondo | G02F 1/295 |
| 2003/0056546 A1 * | 3/2003 | Claus | C03B 37/028 65/435 |
| 2006/0083172 A1 * | 4/2006 | Jordan | H04L 43/50 370/241 |
| 2006/0083472 A1 * | 4/2006 | Sakai | B82Y 20/00 385/27 |
| 2006/0147169 A1 * | 7/2006 | Sugita | B82Y 20/00 385/39 |
| 2008/0019648 A1 * | 1/2008 | Atwater | G02F 1/03 385/122 |
| 2008/0031297 A1 * | 2/2008 | Uchida | G02B 6/1225 438/22 |
| 2008/0047928 A1 * | 2/2008 | Iwata | G02B 6/12 216/24 |
| 2008/0050082 A1 | 2/2008 | Mitomi et al. | |
| 2021/0072567 A1 | 3/2021 | Tai et al. | |
| 2021/0389613 A1 | 12/2021 | Tai et al. | |
| 2022/0413355 A1 * | 12/2022 | Umeki | G02B 6/1223 |

FOREIGN PATENT DOCUMENTS

| | | |
|---|---|---|
| JP | 2008-052108 A | 3/2008 |
| JP | 2008-052109 A | 3/2008 |
| JP | 6650551 B1 | 2/2020 |
| WO | 2013/148349 A1 | 10/2013 |
| WO | 2019/224908 A1 | 11/2019 |

OTHER PUBLICATIONS

International Search Report and Written Opinion (Application No. PCT/JP2021/019007) dated Aug. 10, 2021 (with English translation).

Japanese Office Action (with English translation) dated Feb. 14, 2023 (Application No. 2021-175687).

English translation of the International Preliminary Report on Patentability (Chapter I) dated Dec. 8, 2022 (Application No. PCT/JP2021/019007).

* cited by examiner

COMPOSITE SUBSTRATE FOR PHOTONIC CRYSTAL ELEMENT, AND PHOTONIC CRYSTAL ELEMENT

CROSS-REFERENCE TO RELATED APPLICATIONS

This application is a continuation under 35 U.S.C. 120 of International Application PCT/JP2021/019007 having the International Filing Date of May 19, 2021, and having the benefit of the earlier filing date of Japanese Application No. 2020-092825, filed on May 28, 2020. Each of the identified applications is fully incorporated herein by reference.

BACKGROUND OF THE INVENTION

Technical Field

The present invention relates to a composite substrate for a photonic crystal element and a photonic crystal element.

Background Art

Various electro-optical elements have been known. The electro-optical element can convert an electric signal into an optical signal through use of an electro-optical effect. The electro-optical element is adopted, for example, in optical and radio wave fusion communication, and the development thereof is underway in order to achieve high-speed and large-capacity communication, low power consumption (low drive voltage), and a low footprint. The electro-optical element is formed by using, for example, a composite substrate. The composite substrate typically includes an electro-optical crystal substrate having an electro-optical effect and a support substrate joined to the electro-optical crystal substrate. Thus, the electro-optical crystal substrate can be made thinner, and hence applied development for achieving the various functions listed above has been vigorously performed. In a related-art composite substrate, its electro-optical crystal substrate and support substrate have been joined to each other with an adhesive. According to such configuration, peeling has occurred in the composite substrate owing to the deterioration of the adhesive with time in some cases. Further, damage (e.g., a crack) resulting from such peeling has occurred in the electro-optical crystal substrate in some cases.

To solve such problems as described above, a technology of directly joining the electro-optical crystal substrate and the support substrate to each other without use of any adhesive has been developed (see, for example, Patent Literature 1). However, when the electro-optical crystal substrate and the support substrate are directly joined to each other, an amorphous layer including an element of the electro-optical crystal substrate and an element of the support substrate is formed between the electro-optical crystal substrate and the support substrate. The amorphous layer has no crystallinity, and its optical characteristics are different from those of the electro-optical crystal substrate and the support substrate. In addition, an interface between the electro-optical crystal substrate and the amorphous layer is not flat. Such non-flat interface may scatter (e.g., irregularly reflect or leak) and/or absorb light propagating in the electro-optical crystal substrate. Further, the amorphization may deteriorate the electro-optical effect of an electro-optical crystal to preclude the achievement of a desired reduction in drive voltage of the electro-optical element. To cope with such problems, for example, a technology including interposing a low-refractive index layer between the electro-optical crystal substrate and the support substrate has been proposed.

Incidentally, the development of a photonic crystal element serving as one electro-optical element has been advanced. The applications and development of the photonic crystal element in a wide variety of fields including an optical waveguide, next-generation high-speed communication, a sensor, laser processing, and photovoltaic power generation have been expected. Along with the development of such photonic crystal element, a composite substrate suitable for the photonic crystal element has been desired.

CITATION LIST

Patent Literature

[PTL 1] JP 6650551 B1

SUMMARY OF THE INVENTION

A primary object of the present invention is to provide a composite substrate that can achieve a photonic crystal element having excellent characteristics.

According to one embodiment of the present invention, there is provided a composite substrate for a photonic crystal element, including: an electro-optical crystal substrate having an electro-optical effect; an optical loss-suppressing and cavity-processing layer arranged on one surface of the electro-optical crystal substrate; and a support substrate integrated with the electro-optical crystal substrate through the optical loss-suppressing and cavity-processing layer.

In one embodiment, the optical loss-suppressing and cavity-processing layer is a single layer.

In this embodiment, the composite substrate for a photonic crystal element may further include a peeling-preventing layer between the electro-optical crystal substrate and the optical loss-suppressing and cavity-processing layer.

In this embodiment, the composite substrate for a photonic crystal element may further include a joining layer between the optical loss-suppressing and cavity-processing layer and the support substrate.

In this embodiment, the composite substrate for a photonic crystal element may further include a patterned sacrificial layer formed in the optical loss-suppressing and cavity-processing layer.

In this embodiment, the composite substrate for a photonic crystal element may further include an overcoat layer between the optical loss-suppressing and cavity-processing layer and the support substrate.

In another embodiment, the optical loss-suppressing and cavity-processing layer includes an optical loss-suppressing layer arranged on the electro-optical crystal substrate and a cavity-processing layer arranged on the support substrate, and the optical loss-suppressing layer and the cavity-processing layer are directly joined to each other.

In this embodiment, the composite substrate for a photonic crystal element may further include a joining layer between the optical loss-suppressing layer and the support substrate.

In this embodiment, the composite substrate for a photonic crystal element may further include a patterned sacrificial layer formed in the optical loss-suppressing layer or the cavity-processing layer.

In this embodiment, the composite substrate for a photonic crystal element may further include an overcoat layer between the optical loss-suppressing layer and the cavity-processing layer.

According to another aspect of the present invention, there is provided a photonic crystal element. The photonic crystal element is a photonic crystal element using the above-mentioned composite substrate for a photonic crystal element. The photonic crystal element includes: a photonic crystal layer obtained by periodically forming holes in the electro-optical crystal substrate; a joining portion arranged below the photonic crystal layer, the joining portion being configured to integrate the photonic crystal layer and the support substrate with each other; and a cavity defined by a lower surface of the photonic crystal layer, an upper surface of the support substrate, and the joining portion.

In one embodiment, the photonic crystal element is formed by using the above-mentioned composite substrate for a photonic crystal element.

In one embodiment, the photonic crystal layer has formed therein a through-hole for etching. In this case, the through-hole for etching may have a size larger than a size of each of the holes.

Advantageous Effects of Invention

According to the embodiment of the present invention, in the composite substrate for a photonic crystal element including the electro-optical crystal substrate and the support substrate, the optical loss-suppressing and cavity-processing layer is arranged on one surface of the electro-optical crystal substrate, and the electro-optical crystal substrate and the support substrate are integrated with each other through the optical loss-suppressing and cavity-processing layer. Thus, the photonic crystal element having excellent characteristics can be achieved.

DESCRIPTION OF EMBODIMENTS

Embodiments of the present invention are described below. However, the present invention is not limited to these embodiments.

A. Composite Substrate for Photonic Crystal Element

A-1. Overall Configuration and Modification Example

Figure 1:
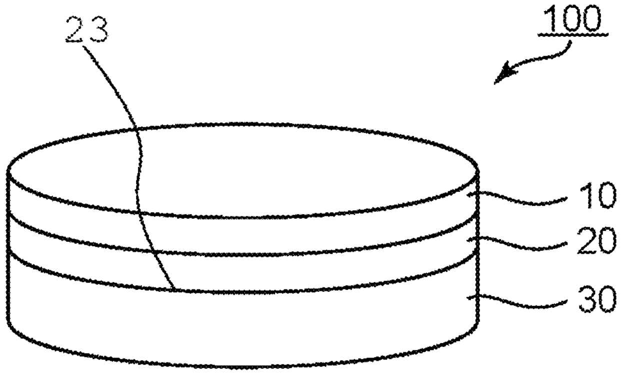
FIG. 1 is a schematic perspective view of a composite substrate for a photonic crystal element according to one embodiment of the present invention.
Figure 2:
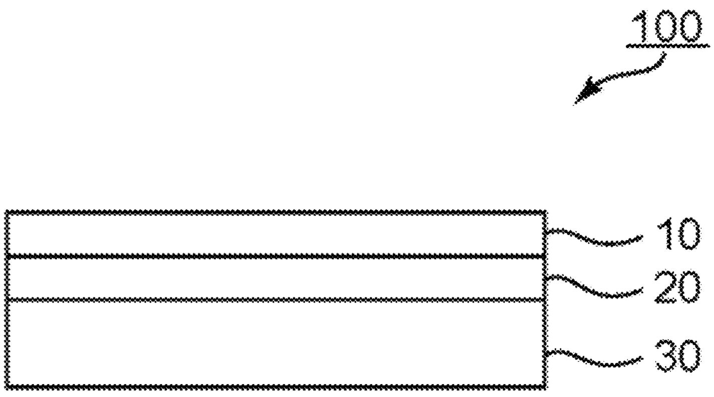
FIG. 2 is a schematic sectional view of the composite substrate for a photonic crystal element of FIG. 1.

FIG. 1 is a schematic perspective view of a composite substrate for a photonic crystal element (hereinafter sometimes simply referred to as "composite substrate") according to one embodiment of the present invention; and FIG. 2 is a schematic sectional view of the composite substrate of FIG. 1. The composite substrate according to the embodiment of the present invention may be typically produced in the form of a so-called wafer as illustrated in FIG. 1. The composite substrate may be provided in the form of such a wafer as illustrated in FIG. 1 to a photonic crystal element manufacturer, or may be provided in the form of a wafer having formed thereon a photonic crystal layer (photonic crystal wafer) to the manufacturer as described later. In this description, the photonic crystal wafer may be referred to as "photonic crystal element." That is, the term "photonic crystal element" as used herein encompasses both of a photonic crystal wafer and a chip obtained by cutting the photonic crystal wafer.

A composite substrate 100 of the illustrated example includes: an electro-optical crystal substrate 10 having an electro-optical effect; an optical loss-suppressing and cavity-processing layer 20 arranged on one surface of the electro-optical crystal substrate; and a support substrate 30 integrated with the electro-optical crystal substrate 10 through the optical loss-suppressing and cavity-processing layer 20. In the embodiment of the illustrated example, the optical loss-suppressing and cavity-processing layer 20 and the support substrate 30 are directly joined to each other. Thus, the electro-optical crystal substrate 10 and the support substrate 30 are integrated with each other. An amorphous layer 23 is typically formed at the joining interface of the direct joining. In the embodiment of the illustrated example, the amorphous layer 23 is a layer formed at the joining interface by the direct joining of the optical loss-suppressing and cavity-processing layer 20 and the support substrate 30. The amorphous layer 23 has an amorphous structure as its name suggests, and the layer includes an element for forming the optical loss-suppressing and cavity-processing layer 20 and an element for forming the support substrate 30. In each of the embodiments of the present invention in addition to the embodiments illustrated in FIG. 1 and FIG. 2, the amorphous layer may be typically formed at the joining interface of the direct joining. The amorphous layer includes the constituent elements of layers or substrates to be directly joined to each other.

As described later, holes are formed in a predetermined pattern in the electro-optical crystal substrate 10 so that the substrate may serve as a photonic crystal layer in a photonic crystal element. The optical loss-suppressing and cavity-processing layer 20 prevents the formation of an amorphous layer on the electro-optical crystal substrate at the time of the direct joining, to thereby suppress the optical loss of the electro-optical crystal substrate. In addition, after the layer has performed an optical loss-suppressing function at the time of the direct joining, the layer may be removed by etching to form a cavity in the photonic crystal element. Further, the etching (typically, dry etching) of the optical loss-suppressing and cavity-processing layer 20 may be stopped at an appropriate level by adjusting, for example, its constituent material and thickness.

When the electro-optical crystal substrate 10 and the support substrate 30 are integrated by direct joining, the peeling of the composite substrate can be satisfactorily suppressed, and as a result, damage (for example, cracking) to the electro-optical crystal substrate caused by such peeling can be satisfactorily suppressed. Further, when the optical loss-suppressing and cavity-processing layer 20 and the support substrate 30 are directly joined to each other, the direct joining of the electro-optical crystal substrate and the support substrate can be avoided. Accordingly, the formation of an amorphous layer on the electro-optical crystal substrate can be prevented. As a result, reductions in optical characteristics of the electro-optical crystal substrate or the optical loss thereof can be suppressed.

As used herein, the "direct joining" means that constituents of a composite substrate (in the examples of FIG. 1 and FIG. 2, the optical loss-suppressing and cavity-processing layer 20 and the support substrate 30) are joined to each other without intermediation of an adhesive. The form of direct joining may be appropriately set depending on the configuration of the layers or substrates to be joined to each other. For example, direct joining may be achieved by the following procedure. In a high vacuum chamber (for example, about $1\times10^{-6}$ Pa), a neutralized beam is applied to each joining surface of the constituents (layers or substrates) to be joined to each other. As a result, each joining surface is activated. Then, in a vacuum atmosphere, the activated joining surfaces are brought into contact with each other and joined to each other at normal temperature. The load at the time of the joining may be, for example, from 100 N to 20,000 N. In one embodiment, when the surface activation is performed with a neutralized beam, an inert gas is introduced into a chamber, and a high voltage is applied from a DC power source to electrodes arranged in the chamber. With such a configuration, electrons move due to the electric field generated between the electrode (positive electrode) and the chamber (negative electrode), and a beam of atoms and ions caused by the inert gas is generated. Of the beams having reached a grid, an ion beam is neutralized by the grid, and hence the beam of neutral atoms is emitted from a high-speed atom beam source. The atomic species forming the beam is preferably an inert gas element (for example, argon (Ar) or nitrogen (N)). The voltage at the time of activation by beam irradiation is, for example, from 0.5 kV to 2.0 kV, and the electric current is, for example, from 50 mA to 200 mA. A method for the direct joining is not limited thereto, and a surface activation method including using an ion gun, an atomic diffusion method, a plasma joining method, or the like may also be applied.

The optical loss-suppressing and cavity-processing layer may be such a single layer as described above, or may include an optical loss-suppressing layer and a cavity-processing layer as described later. That is, the optical loss-suppressing and cavity-processing layer may serve as a single layer to provide both of an optical loss-suppressing function and a cavity-forming function, or may be separated into two layers, that is, the optical loss-suppressing layer and the cavity-processing layer to share the functions.

A modification example of the composite substrate is described below. Specific configurations of the constituents (layers or substrates) of the composite substrate are described later in the section A-2 to the section A-8.

Figure 3:
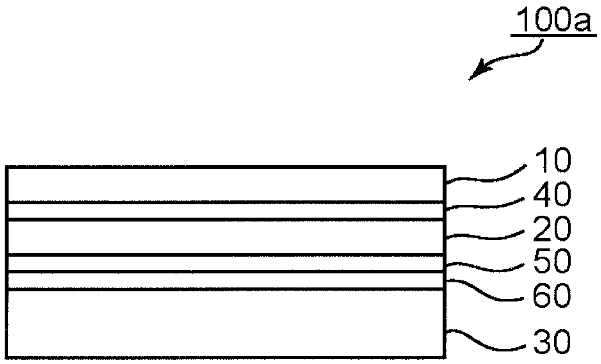
FIG. 3 is a schematic sectional view of a composite substrate for a photonic crystal element according to another embodiment of the present invention.

FIG. 3 is a schematic sectional view of a composite substrate according to another embodiment of the present invention. In a composite substrate 100*a* of the illustrated example, a peeling-preventing layer 40 is arranged between the electro-optical crystal substrate 10 and the optical loss-suppressing and cavity-processing layer 20, and an overcoat layer 50 and a joining layer 60 are arranged between the optical loss-suppressing and cavity-processing layer 20 and the support substrate 30. The joining layer 60 may be directly joined to the support substrate 30 and/or an adjacent layer opposite to the support substrate 30 (in the illustrated example, the overcoat layer 50 or the optical loss-suppressing and cavity-processing layer 20). The following may be performed: the joining layer is arranged on each of the support substrate 30, and the overcoat layer 50 or the optical loss-suppressing and cavity-processing layer 20, and the respective joining layers are directly joined to each other. The arrangement of the peeling-preventing layer 40 can suppress peeling between the electro-optical crystal substrate 10 and its adjacent layer (in the illustrated example, the optical loss-suppressing and cavity-processing layer 20). When the optical loss-suppressing and cavity-processing layer 20 has unevenness, the overcoat layer 50 may be arranged as a layer for flattening the unevenness. Specifically, when a sacrificial layer 70 is formed like FIG. 4 to be described later, the sacrificial layer 70 and the optical loss-suppressing and cavity-processing layer 20 are formed through separate steps, and hence unevenness may be formed on the lower surface of the illustrated example. At this time, when the overcoat layer 50 is formed, a surface serving as a single layer can be formed, and hence flattening treatment can be easily performed. In addition, the arrangement of the joining layer 60 can achieve strong integration of the electro-optical crystal substrate 10 and the support substrate 30. The peeling-preventing layer 40, the overcoat layer 50, and the joining layer 60 are optional layers to be arranged as required, and at least one of the layers may be omitted. In the illustrated example, for example, the overcoat layer 50, the peeling-preventing layer 40 and the overcoat layer 50, or the overcoat layer 50 and the joining layer 60 may be omitted. When the joining layer is present, an amorphous layer may be formed at the interface of the direct joining of the joining layer and its adjacent layer (including the interface of the direct joining of the joining layers). When the overcoat layer and the joining layer are omitted, as in FIG. 2, the optical loss-suppressing and cavity-processing layer 20 and the support substrate 30 are directly joined to each other, and an amorphous layer may be formed at a joining interface therebetween.

Figure 4:
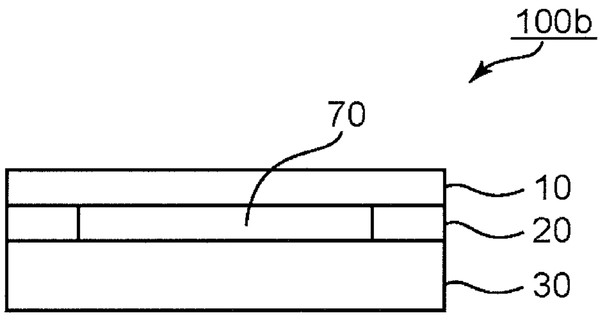
FIG. 4 is a schematic sectional view of a composite substrate for a photonic crystal element according to still another embodiment of the present invention.

FIG. 4 is a schematic sectional view of a composite substrate according to still another embodiment of the present invention. In a composite substrate 100*b* of the illustrated example, the sacrificial layer 70 is formed in the optical loss-suppressing and cavity-processing layer 20. When the sacrificial layer 70 is arranged, a cavity for effectively expressing the function of a photonic crystal can be easily formed into a desired shape. The cavity preferably has a sufficient thickness over an entire region directly below the holes of the photonic crystal. Accordingly, the sacrificial layer 70 is formed in a predetermined pattern in accordance with purposes. In the embodiment of the illustrated example, the sacrificial layer 70 is typically formed into a pattern and a shape corresponding to the cavity in the photonic crystal element. In the embodiment of the illustrated example, the overcoat layer 50 and/or the joining layer 60 may be further arranged between the optical loss-suppressing and cavity-processing layer 20 (the sacrificial layer 70) and the support substrate 30 as required. When the joining layer 60 is arranged alone, the joining layer 60 may be directly joined to the optical loss-suppressing and cavity-processing layer 20 (the sacrificial layer 70) and/or the support substrate 30. When the overcoat layer 50 and the joining layer 60 are arranged, the overcoat layer 50 is typically arranged on the sacrificial layer 70 side. The joining layer 60 may be directly joined to the overcoat layer 50 and/or the support substrate 30. As in the above-mentioned embodiment, the following may be performed: the joining layer is arranged on each of the layers or the substrates to be joined to each other, and the joining layers are directly joined to each other.

Figure 5:
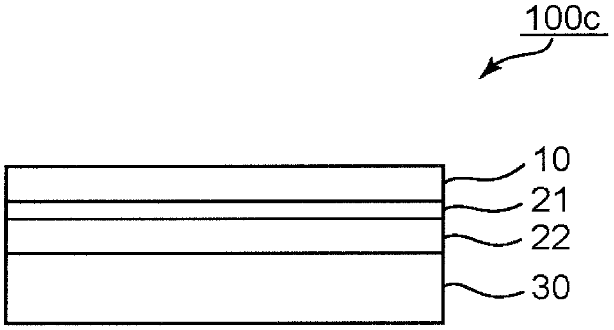
FIG. 5 is a schematic sectional view of a composite substrate for a photonic crystal element according to still another embodiment of the present invention.
Figure 6:
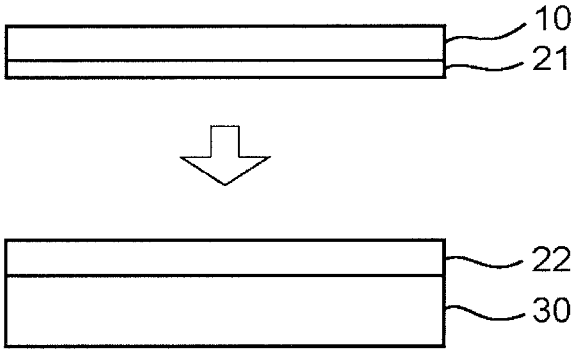
FIG. 6 is a schematic sectional view for illustrating a method of producing the composite substrate for a photonic crystal element of FIG. 5.

FIG. 5 is a schematic sectional view of a composite substrate according to still another embodiment of the present invention. In a composite substrate 100*c* of the illustrated example, the optical loss-suppressing and cavity-processing layer includes an optical loss-suppressing layer 21 and a cavity-processing layer 22. Typically, the optical loss-suppressing layer 21 is formed on the electro-optical crystal substrate 10, and the cavity-processing layer 22 is formed on the support substrate 30. Typically, as illustrated in FIG. 6, the optical loss-suppressing layer 21 of a laminate including the optical loss-suppressing layer 21 and the electro-optical crystal substrate 10, and the cavity-processing layer 22 of a laminate including the cavity-processing layer 22 and the support substrate 30 are directly joined to each other to form a laminated structure of the optical loss-suppressing layer 21 and the cavity-processing layer 22. The adoption of the laminated structure of the optical loss-suppressing layer 21 and the cavity-processing layer 22 can suppress damage to an electro-optical crystal layer due to the etching of the cavity-processing layer, and/or prevent the holes from penetrating the cavity-processing layer to reach the support substrate at the time of the production of a photonic crystal structure. Further, the adoption can prevent a dissimilar element from diffusing into the electro-optical crystal substrate at the time of a process, such as joining or etching.

Figure 7:
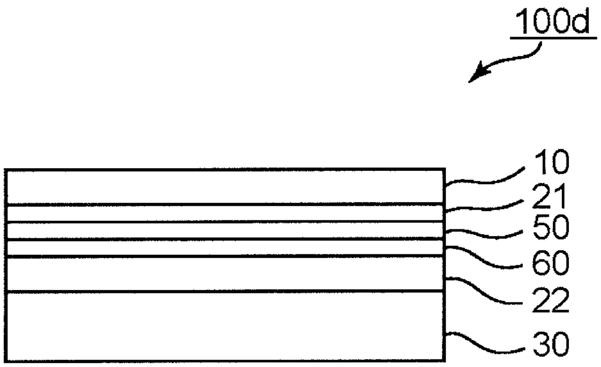
FIG. 7 is a schematic sectional view of a composite substrate for a photonic crystal element according to still another embodiment of the present invention.

FIG. 7 is a schematic sectional view of a composite substrate according to still another embodiment of the present invention. In a composite substrate 100*d* of the illustrated example, the overcoat layer 50 and the joining layer 60 are arranged between the optical loss-suppressing layer 21 and the cavity-processing layer 22. The overcoat layer 50 and the joining layer 60 are optional layers to be arranged as required, and at least one of the layers may be omitted. In the embodiment of the illustrated example, only the joining layer 60 may be arranged in many cases. The joining layer 60 may be directly joined to the cavity-processing layer 22 and/or an adjacent layer opposite to the cavity-processing layer 22 (in the illustrated example, the overcoat layer 50 or the optical loss-suppressing layer 21). As in the above-mentioned embodiment, the following may be performed: the joining layer is arranged on each of the layers to be joined to each other (in the illustrated example, the cavity-processing layer 22 and the overcoat layer 50 or the optical loss-suppressing layer 21), and the respective joining layers are directly joined to each other.

Figure 8:
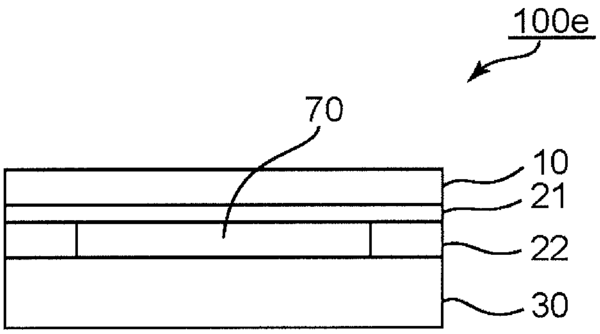
FIG. 8 is a schematic sectional view of a composite substrate for a photonic crystal element according to still another embodiment of the present invention.

FIG. 8 is a schematic sectional view of a composite substrate according to still another embodiment of the present invention. In a composite substrate 100*e* of the illustrated example, the sacrificial layer 70 is formed in the cavity-processing layer 22. When the laminated structure of the optical loss-suppressing layer 21 and the cavity-processing layer 22 is adopted, and the sacrificial layer 70 is formed in the cavity-processing layer 22, there is an advantage in that the cavity can be formed at a designed position and into a designed shape. In the embodiment of the illustrated example, the joining layer 60 may be further arranged between the optical loss-suppressing layer 21 and the cavity-processing layer 22 (the sacrificial layer 70), or between the cavity-processing layer 22 (the sacrificial layer 70) and the support substrate 30 as required. As in the case of the above-mentioned embodiment, the joining layer 60 may be joined as follows: the joining layer is directly joined to at least one adjacent layer; or the joining layer is arranged on each of the layers to be joined to each other, and the respective joining layers are directly joined to each other.

Figure 9:
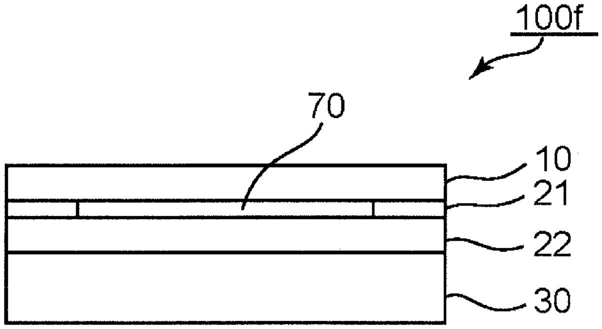
FIG. 9 is a schematic sectional view of a composite substrate for a photonic crystal element according to still another embodiment of the present invention.

FIG. 9 is a schematic sectional view of a composite substrate according to still another embodiment of the present invention. In a composite substrate 100*f* of the illustrated example, the sacrificial layer 70 is formed in the optical loss-suppressing layer 21. In the composite substrate 100*f*, the cavity-processing layer 22 and the support substrate 30 may be directly joined to each other. When the laminated structure of the optical loss-suppressing layer 21 and the cavity-processing layer 22 is adopted, and the sacrificial layer 70 is formed in the optical loss-suppressing layer 21, there is an advantage in that the cavity can be formed at a designed position and into a designed shape. The structure is effective when patterning on the cavity-processing layer 22 is difficult. In the embodiment of the illustrated example, the overcoat layer 50 and/or the joining layer 60 may be further arranged between the optical loss-suppressing layer 21 (the sacrificial layer 70) and the cavity-processing layer 22, or between the cavity-processing layer 22 and the support substrate 30 as required.

The above-mentioned embodiments may be appropriately combined in accordance with purposes. Further/alternatively, the embodiments may be subjected to alterations well-known in the art.

A-2. Electro-optical Crystal Substrate

The electro-optical crystal substrate 10 has an upper surface exposed to the outside and a lower surface positioned in the composite substrate. In the embodiment of the present invention, part or the entirety of the electro-optical crystal substrate 10 serves as an optical waveguide for propagating light in a photonic crystal element to be produced from the composite substrate. The electro-optical crystal substrate 10 is formed of a crystal of a material having an electro-optical effect. Specifically, the optical constant (for example, the refractive index) of the electro-optical crystal substrate 10 may be changed when an electric field is applied. In one embodiment, a c-axis of the electro-optical crystal substrate 10 may be parallel to the electro-optical crystal substrate 10. That is, the electro-optical crystal substrate 10 may be an X-cut substrate or a Y-cut substrate. In another embodiment, the c-axis of the electro-optical crystal substrate 10 may be perpendicular to the electro-optical crystal substrate 10. That is, the electro-optical crystal substrate 10 may be a Z-cut substrate. The thickness of the electro-optical crystal substrate 10 may be set to any appropriate thickness depending on the frequency and wavelength of an electromagnetic wave to be used. The thickness of the electro-optical crystal substrate 10 may be, for example, from 0.1 μm to 10 μm, or for example, from 0.1 μm to 3 μm. As described later, the composite substrate is reinforced by the support substrate, and hence the thickness of the electro-optical crystal substrate can be reduced.

As a material for forming the electro-optical crystal substrate 10, any appropriate material may be used as long as the effects achieved in the embodiment of the present invention can be obtained. As such a material, there is typically given a dielectric (for example, ceramics). Specific examples thereof include lithium niobate ($LiNbO_3$: LN), lithium tantalate ($LiTaO_3$: LT), potassium titanate phosphate ($KTiOPO_4KTP$), potassium lithium niobate ($K_xLi_{(1-x)}NbO_2$: KLM), potassium niobate ($KNbO_3$: KN), potassium tantalate niobate ($KNb_xTa_{(1-x)}O_3$: KTN), and a solid solution of lithium niobate and lithium tantalate.

A-3. Support Substrate

The support substrate 30 has an upper surface positioned in the composite substrate and a lower surface exposed to the outside. The support substrate 30 is formed in order to increase the strength of the composite substrate. Because of this, the thickness of the electro-optical crystal substrate can be reduced. As the support substrate 30, any appropriate configuration may be adopted. Specific examples of the material for forming the support substrate 30 include silicon (Si), glass, sialon ($Si_3N_4$—$Al_2O_3$), mullite ($3Al_2O_3 \cdot 2SiO_2$, $2Al_2O_3 \cdot 3SiO_2$), aluminum nitride (AlN), silicon nitride ($Si_3N_4$), magnesium oxide (MgO), sapphire, quartz, crystal, gallium nitride (GaN), silicon carbide (SiC), and gallium oxide ($Ga_2O_3$). It is preferred that the coefficient of linear expansion of the material for forming the support substrate 30 be as close as possible to the coefficient of linear expansion of the material for forming the electro-optical crystal substrate 10. With such a configuration, thermal deformation (typically, warpage) of the composite substrate can be suppressed. Preferably, the coefficient of linear expansion of the material for forming the support substrate 30 falls within a range of from 50% to 150% with respect to the coefficient of linear expansion of the material for forming the electro-optical crystal substrate 10. From this viewpoint, the material of the support substrate may be the same as that of the electro-optical crystal substrate 10.

A-4. Optical Loss-Suppressing and Cavity-Processing Layer

A-4-1. Single Layer

As described above, the optical loss-suppressing and cavity-processing layer (single layer) 20 has an optical loss-suppressing function, a cavity-processing function, and an etching-stopping function. Any appropriate configuration may be adopted as the optical loss-suppressing and cavity-processing layer as long as the configuration has such functions. Examples of a material for forming the optical loss-suppressing and cavity-processing layer (single layer) include: silicon oxide ($SiO_2$); amorphous silicon (a-Si); polycrystalline silicon (i.e., excluding monocrystalline silicon); molybdenum; aluminum oxide ($Al_2O_3$); compounds of these materials; and a mixture of these materials. The thickness of the optical loss-suppressing and cavity-processing layer (single layer) is, for example, from 0.1 μm to 1.0 μm, and is, for example, from 0.5 μm to 1.0 μm.

A-4-2. Laminated Structure of Optical Loss-Suppressing Layer and Cavity-Processing Layer When the optical loss-suppressing and cavity-processing layer includes the optical loss-suppressing layer 21 and the cavity-processing layer 22, any appropriate configuration may be adopted as the optical loss-suppressing layer as long as the configuration has an optical loss-suppressing function. Examples of a material for forming the optical loss-suppressing layer include: amorphous silicon; polycrystalline silicon (i.e., excluding monocrystalline silicon); molybdenum; aluminum oxide; compounds of these materials; and a mixture of these materials. The thickness of the optical loss-suppressing layer is, for example, from 0.01 μm (10 nm) to 0.1 μm (100 nm), and is, for example, from 0.01 μm (10 nm) to 0.05 μm (50 nm).

Any appropriate configuration may be adopted as the cavity-processing layer as long as the configuration has a cavity-processing function and an etching-stopping function. Examples of a material for forming the cavity-processing layer include: silicon oxide; amorphous silicon; polycrystalline silicon; monocrystalline silicon; molybdenum; aluminum oxide; compounds of these materials; and a mixture of these materials. The thickness of the cavity-processing layer is, for example, from 0.1 μm to 1.0 μm, and is, for example, from 0.3 μm to 0.7 μm.

A-5. Peeling-Preventing Layer

As described above, the peeling-preventing layer 40 is arranged for preventing or suppressing the peeling between the electro-optical crystal substrate 10 and its adjacent layer (typically, the optical loss-suppressing and cavity-processing layer 20). Any appropriate configuration may be adopted as the peeling-preventing layer in accordance with the configurations of the electro-optical crystal substrate and the adjacent layer. Examples of a material for forming the peeling-preventing layer include amorphous silicon, tantalum oxide ($Ta_2O_5$), niobium oxide ($Nb_2O_5$), titanium oxide ($TiO_2$), aluminum oxide, and hafnium oxide ($HfO_2$). The thickness of the peeling-preventing layer is, for example, from 0.01 μm to 0.1 μm.

A-6. Overcoat Layer

As described above, when the optical loss-suppressing and cavity-processing layer 20 has unevenness, the overcoat layer 50 is arranged for flattening the unevenness. Any appropriate configuration may be adopted as the overcoat layer in accordance with purposes and the configuration of the adjacent layer (e.g., the sacrificial layer). Examples of a material for forming the overcoat layer include amorphous silicon, niobium oxide, tantalum oxide, silicon oxide, titanium oxide, aluminum oxide, and hafnium oxide. The thickness of the overcoat layer is, for example, from 0.01 μm to 1 μm.

A-7. Joining Layer

As described above, the joining layer 60 is arranged for achieving strong integration of the electro-optical crystal substrate and the support substrate by improving a joining strength therebetween. Any appropriate configuration may be adopted as the joining layer in accordance with the configurations of the substrates or the layers to be joined to each other. Examples of a material for forming the joining layer include silicon oxide, amorphous silicon, tantalum oxide, alumina ($Al_2O_3$), hafnia ($HfO_2$), a Cr/Au alloy, and a Cr/Cu alloy. The thickness of the joining layer is, for example, from 0.01 μm to 0.1 μm, and is, for example, from 0.01 μm to 0.05 μm.

A-8. Sacrificial Layer

As described above, the sacrificial layer 70 is arranged for forming the cavity at a designed position and into a designed shape. Any appropriate configuration may be adopted as the sacrificial layer in accordance with purposes. Examples of a material for forming the sacrificial layer include: amorphous silicon; silicon; molybdenum; silicon oxide; aluminum oxide; compounds of these materials; and a mixture of these materials. The thickness of the sacrificial layer is, for example, from 0.1 μm to 1.0 μm, and is, for example, from 0.2 μm to 0.7 μm.

B. Photonic Crystal Element

B-1. Configuration of Photonic Crystal Element

Figure 10:
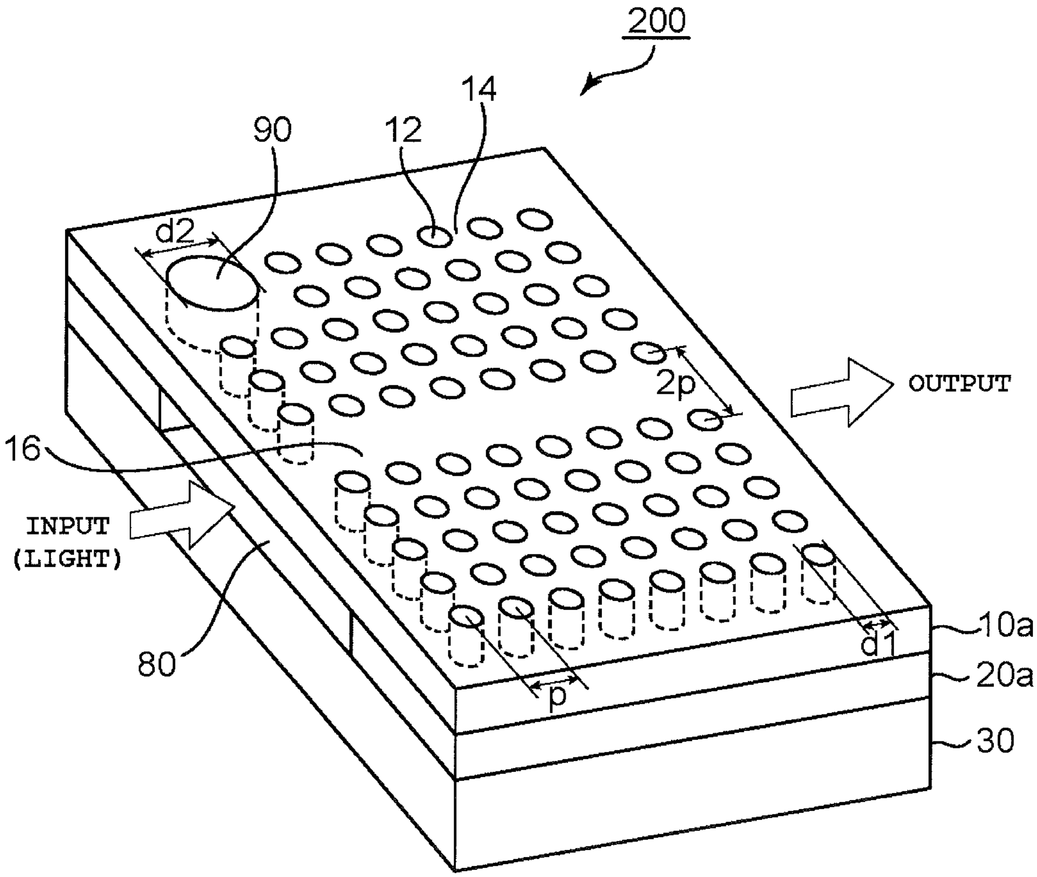
FIG. 10 is a schematic perspective view of a photonic crystal element according to one embodiment of the present invention.

FIG. 10 is a schematic perspective view of a photonic crystal element according to one embodiment of the present invention. A photonic crystal element 200 of the illustrated example includes: a photonic crystal layer 10*a* obtained by periodically forming holes 12 in the electro-optical crystal substrate 10; a joining portion 20*a* arranged below the photonic crystal layer 10*a*, the joining portion 20*a* being configured to integrate the photonic crystal layer 10*a* and the support substrate 30 with each other; and a cavity 80 defined by a lower surface of the photonic crystal layer 10*a*, an upper surface of the support substrate 30, and an inner side surface of the joining portion 20*a*. The cavity 80 is formed by removing the optical loss-suppressing and cavity-processing layer of the composite substrate described in the section A through etching, and the joining portion 20*a* is formed by the residue of the optical loss-suppressing and cavity-processing layer.

A photonic crystal for forming the photonic crystal layer 10*a* is a multidimensional periodic structural body formed by arranging a medium having a large refractive index and a medium having a small refractive index at a period comparable to the wavelength of light, and has the band structure of light similar to the band structure of an electron. Accordingly, appropriate design of the periodic structure can express a forbidden band (photonic band gap) for predetermined light. A photonic crystal having a forbidden band functions as an object that neither reflects nor transmits light having a predetermined wavelength. The introduction of a line defect that disturbs periodicity into the photonic crystal having a photonic band gap results in the formation of a waveguide mode in the frequency region of the band gap, and hence can achieve an optical waveguide that propagates light with a low loss.

The photonic crystal of the illustrated example is a so-called slab two-dimensional photonic crystal. The slab two-dimensional photonic crystal refers to a photonic crystal obtained by: arranging, on a thin-plate slab made of a dielectric material or a semiconductor, circular columnar or polygonal columnar low-refractive index pillars each having a refractive index lower than the refractive index of the material for forming the thin-plate slab at appropriate two-dimensional periodic intervals in accordance with purposes and a desired photonic band gap; and sandwiching the upper and lower portions of the thin-plate slab between an upper clad and a lower clad each having a refractive index lower than that of the thin-plate slab. In the illustrated example, the holes 12 function as the low-refractive index pillars, a portion 14 between the holes 12, 12 of the electro-optical crystal substrate 10 functions as a high-refractive index portion, the cavity 80 functions as the lower clad, and an external environment (air portion) above the photonic crystal element 200 functions as the upper clad. A portion in the electro-optical crystal substrate 10 where the periodic pattern of the holes 12 is not formed serves as a line defect, and the line defect portion forms an optical waveguide 16.

As described above, the holes 12 may be formed as a periodic pattern. The holes 12 are typically arrayed so as to form regular lattices. Any appropriate form may be adopted as the form of each of the lattices as long as a predetermined photonic band gap can be achieved. Typical examples thereof include a triangular lattice and a square lattice. In one embodiment, the holes 12 may be through-holes. The through-holes are easy to form, and as a result, their refractive indices are easy to adjust. Any appropriate shape may be adopted as the plan-view shape of each of the holes (through-holes). Specific examples thereof include equilateral polygons (e.g., an equilateral triangle, a square, an equilateral pentagon, an equilateral hexagon, and an equilateral octagon), a substantially circular shape, and an elliptical shape. Of those, a substantially circular shape is preferred. The ratio of the long diameter of the substantially circular shape to the short diameter thereof is preferably from 0.90 to 1.10, more preferably from 0.95 to 1.05. As described above, the through-holes 12 may be low-refractive index pillars (pillar-shaped portions each including a low-refractive index material). However, the through-holes are easier to form, and the through-holes each include air having the lowest refractive index. Accordingly, a difference in refractive index between each of the through-holes and the optical waveguide can be made larger. In addition, some of the hole diameters may be different from the other hole diameters.

The lattice pattern of the holes may be appropriately set in accordance with purposes and a desired photonic band gap. In the illustrated example, the holes each having a diameter d1 form square lattices at a period P. The square lattice patterns are formed on both the sides of the photonic crystal element, and the optical waveguide 16 is formed in the central portion thereof where no lattice pattern is formed. The width of the optical waveguide 16 may be, for example, from 1.01P to 3P (2P in the illustrated example) with respect to the hole period P. The number of the rows of the holes (hereinafter sometimes referred to as "lattice rows") in the optical waveguide direction may be from 3 to 10 (5 in the illustrated example) on each side of the optical waveguide. The hole period P may satisfy, for example, the following relationship:

$$(1/7)\times(\lambda/n)\leq P\leq 1.4\times(\lambda/n)$$

where λ represents the wavelength (nm) of light to be introduced into the optical waveguide, and "n" represents the refractive index of the electro-optical crystal substrate. The hole period P may be specifically from 0.1 μm to 1 μm. In one embodiment, the hole period P may be identical to the thickness of the photonic crystal layer (electro-optical crystal substrate). The diameter d1 of each of the holes may be, for example, from 0.1P to 0.9P with respect to the hole period P. When the diameter d1 of each of the holes, the hole period P, the number of the lattice rows, the number of the holes in one lattice row, the thickness of the photonic crystal layer, the constituent material (substantially, refractive index) of the electro-optical crystal substrate, the width of the line defect portion, the width and height of the cavity to be described later, and the like are adjusted by being appropriately combined with each other, the desired photonic band gap can be obtained. Further, the same effect can be obtained for an electromagnetic wave except a light wave. Specific examples of the electromagnetic wave include a millimeter wave, a microwave, and a terahertz wave.

As described above, the cavity 80 is formed by removing the optical loss-suppressing and cavity-processing layer 20 of the composite substrate through etching, and can function as the lower clad. The width of the cavity is preferably larger than the width of the optical waveguide. For example, the cavity 80 may extend up to the third lattice row from the optical waveguide 16. In the illustrated example, the cavity 80 extends up to the third lattice row from the optical waveguide 16. Light propagates in the optical waveguide, and moreover, part of light energy may diffuse up to the lattice row near the optical waveguide. Accordingly, the arrangement of the cavity directly below such lattice row can suppress a propagation loss due to light leakage. From this viewpoint, the cavity may be formed over the entire region of a hole-formed portion. The height of the cavity is preferably 0.1 μm or more, and is more preferably ⅕ or more of the wavelength of the light propagating therein. Such height causes the thin-plate slab to function as a photonic crystal, and hence can achieve an optical waveguide having higher wavelength selectivity and a lower loss. The height of the cavity may be controlled by adjusting the thickness of a constituent (layer) except the electro-optical crystal substrate and the support substrate in the composite substrate.

In one embodiment, a through-hole 90 for etching may be formed in the photonic crystal layer 10*a*. The formation of the through-hole 90 for etching enables an etchant to satisfactorily pervade the entirety of a region to be etched. As a result, a desired cavity can be more precisely formed. Although a single through-hole for etching is formed in the illustrated example, a plurality of (e.g., 2, 3, or 4) through-holes for etching may be formed. The through-hole for etching is formed at, for example, a position distant from the optical waveguide by 3 or more lattice rows. Such configuration enables the etchant to satisfactorily pervade the entirety of the region to be etched without adversely affecting the photonic band gap of the photonic crystal. The through-hole for etching may also be formed on, for example, the input portion side and/or output portion side (i.e., a corner portion of the photonic crystal layer) of the end portion of the lattice pattern opposite to the optical waveguide. Such configuration can more satisfactorily prevent adverse effects on the photonic band gap. For example, when 4 through-holes for etching are formed, the through-holes may be formed at the 4 corners of the photonic crystal layer. The size of the through-hole 90 for etching is typically larger than the size of each of the holes 12. For example, the diameter d2 of the through-hole for etching is preferably 5 or more times, more preferably 50 or more times, still more preferably 100 or more times as large as the diameter d1 of each of the holes. Meanwhile, the d2 is preferably 1,000 or less times as large as the d1. When the d2 is excessively small, the etchant may not satisfactorily pervade the entirety of the region to be etched. When the d2 is excessively large, the photonic band gap may be adversely affected.

B-2. Method of producing Photonic Crystal Element

Figure 11A:
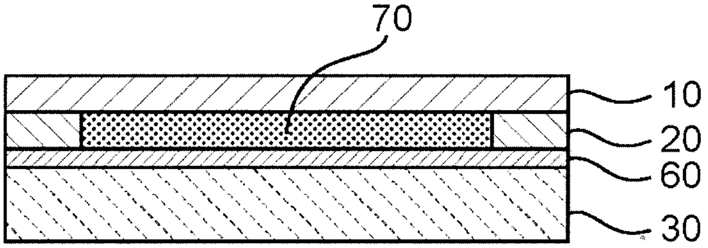
FIG. 11A to FIG. 11C are schematic sectional views for illustrating an example of a method of producing the photonic crystal element according to the embodiment of the present invention.
Figure 11B:
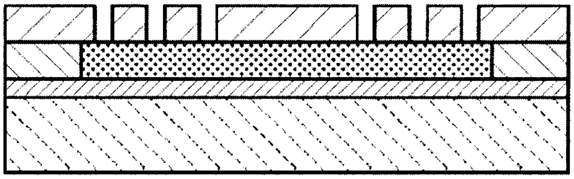
Figure 11C:
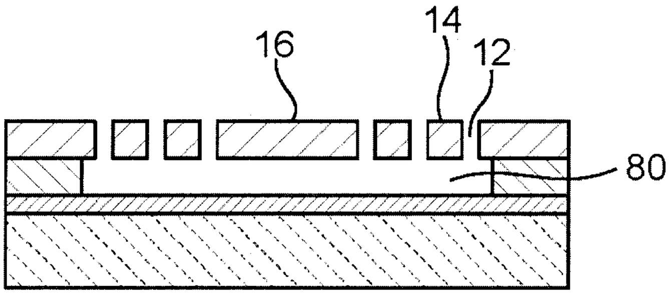

A typical example of a method of producing a photonic crystal element is simply described with reference to FIGS. 11 to FIG. 13. FIG. 11A to FIG. 11C are schematic sectional views for illustrating an example of a process for the production of the photonic crystal element from a composite substrate. This example is a process for the production of the photonic crystal element from such a composite substrate similar to the composite substrate of FIG. 4 as illustrated in FIG. 11A. The composite substrate differs from the composite substrate of FIG. 4 in that the joining layer 60 is further arranged between the optical loss-suppressing and cavity-processing layer 20 (the sacrificial layer 70) and the support substrate 30. First, as illustrated in FIG. 11B, the holes 12 are formed in the electro-optical crystal substrate 10 by etching through a predetermined mask. The etching is typically dry etching (e.g., reactive ion etching). The holes 12 may be formed in, for example, such a pattern as illustrated in FIG. 10. In the drawings, the formation of the through-hole for etching is omitted. Next, the sacrificial layer 70 is etched by bringing the composite substrate in which the holes are formed in the electro-optical crystal substrate into contact with (e.g., immersing the composite substrate in) a predetermined etchant. As a result, as illustrated in FIG. 11C, the cavity 80 is formed, and hence the photonic crystal element is obtained. When the mask for etching at the time of the formation of the holes and the sacrificial layer are formed of the same material, the residue of the mask and the sacrificial layer can be simultaneously removed by one contact (e.g., immersion).

Figure 12A:
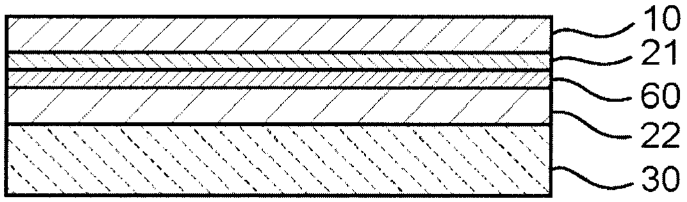
FIG. 12A to FIG. 12D are schematic sectional views for illustrating another example of the method of producing the photonic crystal element according to the embodiment of the present invention.
Figure 12B:
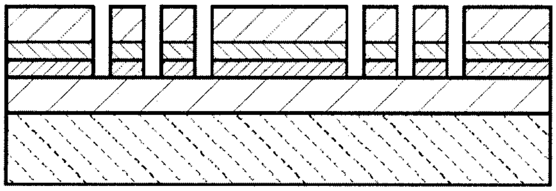
Figure 12C:
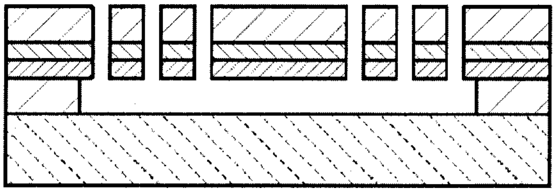
Figure 12D:
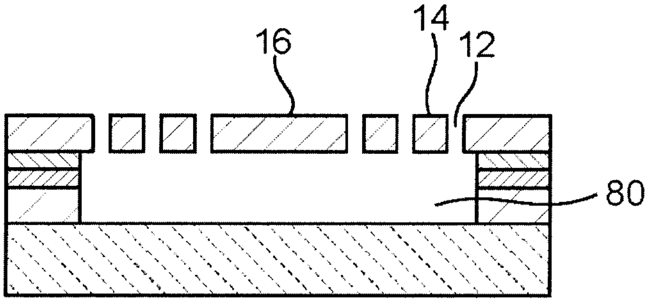

FIG. 12A to FIG. 12D are schematic sectional views for illustrating another example of the process for the production of a photonic crystal element from a composite substrate. This example is a process for the production of the photonic crystal element from such a composite substrate similar to the composite substrate of FIG. 5 as illustrated in FIG. 12A. The composite substrate differs from the composite substrate of FIG. 5 in that the joining layer 60 is further arranged between the optical loss-suppressing layer 21 and the cavity-processing layer 22. First, as illustrated in FIG. 12B, the holes 12 are formed in the electro-optical crystal substrate 10, the optical loss-suppressing layer 21, and the joining layer 60 by dry etching (e.g., reactive ion etching) through a predetermined mask. Next, as illustrated in FIG. 12C, a predetermined portion of the cavity-processing layer 22 is removed by wet etching (e.g., immersion in an etchant). Finally, as illustrated in FIG. 12D, the remaining optical loss-suppressing layer 21 and joining layer 60 are removed by wet etching (e.g., immersion in an etchant). As a result, the cavity 80 is formed, and hence the photonic crystal element is obtained.

Figure 13A:
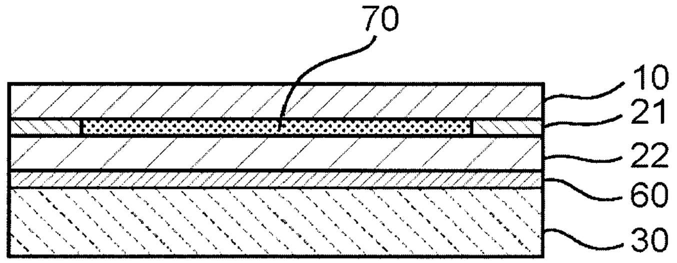
FIG. 13A to FIG. 13D are schematic sectional views for illustrating still another example of the method of producing the photonic crystal element according to the embodiment of the present invention.
Figure 13B:
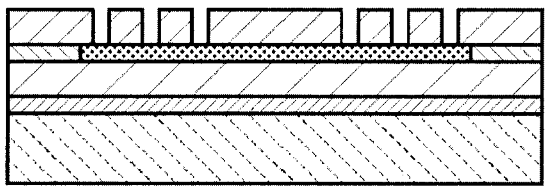
Figure 13C:
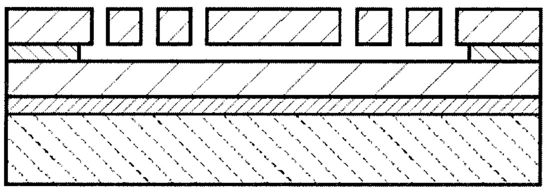
Figure 13D:
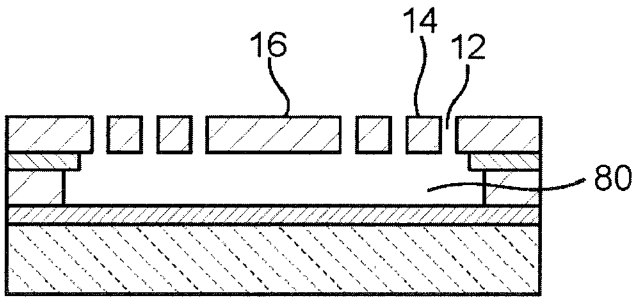

FIG. 13A to FIG. 13D are schematic sectional views for illustrating still another example of the process for the production of a photonic crystal element from a composite substrate. This example is a process for the production of the photonic crystal element from such a composite substrate similar to the composite substrate of FIG. 9 as illustrated in FIG. 13A. The composite substrate differs from the composite substrate of FIG. 9 in that the joining layer 60 is further arranged between the cavity-processing layer 22 and the support substrate 30. First, as illustrated in FIG. 13B, the holes 12 are formed in the electro-optical crystal substrate 10 by dry etching (e.g., reactive ion etching) through a predetermined mask. Next, as illustrated in FIG. 13C, the sacrificial layer 70 is removed by wet etching (e.g., immersion in an etchant). Subsequently, as illustrated in FIG. 13D, the cavity-processing layer 22 is removed by wet etching (e.g., immersion in an etchant). As a result, the cavity 80 is formed, and hence the photonic crystal element is obtained. When the sacrificial layer and the cavity-processing layer are formed of the same material, the residue of the sacrificial layer and the cavity-processing layer can be simultaneously removed by one contact (e.g., immersion).

Needless to say, a process different from those of the illustrated examples may be adopted for the production of the photonic crystal element. When the overall configuration of the composite substrate, the constituent materials of the respective layers of the composite substrate, the mask, an etching mode, and the like are appropriately combined with each other, the holes and the cavity can be formed by an efficient procedure and with high accuracy, and hence the photonic crystal element can be produced.

EXAMPLES

Now, the present invention is specifically described by way of Examples. However, the present invention is not limited to these Examples.

Example 1

1. Production of Composite Substrate for Photonic Crystal Element

An X-cut lithium niobate substrate having a diameter of 4 inches was prepared as an electro-optical crystal substrate, and a silicon substrate having a diameter of 4 inches was prepared as a support substrate. First, amorphous silicon (a-Si) was sputtered onto the electro-optical crystal substrate to form an optical loss-suppressing layer having a thickness of 20 nm. Meanwhile, silicon oxide was sputtered onto the support substrate to form a cavity-processing layer having a thickness of 0.5 μm, and a-Si was sputtered onto the cavity-processing layer to form a joining layer having a thickness of 20 nm. Next, the surface of each of the optical loss-suppressing layer and the joining layer was subjected to CMP polishing so that the arithmetic average roughness Ra of the surface of each of the optical loss-suppressing layer and the joining layer was set to 0.3 nm or less. Next, the surfaces of the optical loss-suppressing layer and the joining layer were washed, and then the optical loss-suppressing layer and the joining layer were directly joined to each other to integrate the electro-optical crystal substrate and the support substrate with each other. The direct joining was performed as described below. In a vacuum of the order of $10^{-6}$ Pa, the joining surfaces of the electro-optical crystal substrate and the support substrate (the surfaces of the optical loss-suppressing layer and the joining layer) were irradiated with high-speed Ar neutral atom beams (acceleration voltage: 1 kV, Ar flow rate: 60 sccm) for 70 seconds. After the irradiation, the electro-optical crystal substrate and the support substrate were left standing to cool by being left for 10 minutes, and then the joining surfaces of the electro-optical crystal substrate and the support substrate were brought into contact with each other, followed by pressurization at 4.90 kN for 2 minutes. Thus, the electro-optical crystal substrate and the support substrate were joined to each other. After the joining, polishing was performed until the thickness of the electro-optical crystal substrate became 0.5 μm. Thus, a composite substrate for a photonic crystal element similar to that of FIG. 5 (provided that the joining layer was present between the optical loss-suppressing layer and the cavity-processing layer) was obtained. In the resultant composite substrate for a photonic crystal element, a failure such as peeling was not observed at a joining interface.

2. Production of Photonic Crystal Element

A photonic crystal element was produced from the composite substrate for a photonic crystal element obtained in the foregoing by a method corresponding to the production method illustrated in FIG. 12. Specifically, the photonic crystal element was produced by the following procedure. First, molybdenum (Mo) was formed into a film serving as a metal mask on the electro-optical crystal substrate. Next, a resin pattern having holes at a predetermined arrangement was formed on the metal mask by a nanoimprint method. Specifically, 10 lattice rows having holes each having a diameter of 444 nm at a period (pitch) of 550 nm in each of an optical waveguide direction and a direction perpendicular to the optical waveguide direction were formed as a hole pattern corresponding to the holes of a photonic crystal on each of the left side and the right side when the photonic crystal was viewed in plan view. No hole was formed in the central portion when the photonic crystal was viewed in plan view (the portion finally serves as an optical waveguide). Further, 4 holes each having a diameter of 200 μm (a pattern of through-holes for etching) were formed in corner portions when the photonic crystal was viewed in plan view (the input portion sides and output portion sides of the end portions of the left and right lattice row portions opposite to the portion serving as the optical waveguide). Next, holes corresponding to the patterns were formed in the Mo mask by etching with a Mo etchant (mixed liquid containing nitric acid, acetic acid, and phosphoric acid at a mixing ratio of 10:15:1). Next, the hole patterns and the through-holes for etching were formed in the composite substrate by fluorine-based reactive ion etching through the pattern-formed Mo mask. Next, the composite substrate was immersed in a buffered hydrofluoric acid (BHF) etchant so that the cavity-processing layer was removed. Thus, a cavity was formed. Further, the residue of the Mo mask was removed with the Mo etchant. Finally, the composite substrate was immersed in tetramethylammonium hydroxide (TMAH) diluted to about 10% so that the optical loss-suppressing layer and the joining layer were etched. Thus, a photonic crystal wafer was produced. The resultant photonic crystal wafer was cut into chips by dicing to provide the photonic crystal elements. The optical waveguide length of each of the photonic crystal elements was set to 10 mm. After the chip cutting, the input-side end surface and output-side end surface of the optical waveguide were subjected to end surface polishing.

The resultant photonic crystal elements (chips) were cut in their thickness directions, and sections thereof were observed with a microscope. As a result, cavities were satisfactorily formed directly below the photonic crystal layers of the chips. The yield of the chips whose cavities were able to be formed as designed was 100%.

Further, the optical insertion loss of each of the resultant chips was measured. Specifically, light having a wavelength of 1.55 μm was introduced into the chip (substantially, the optical waveguide of the photonic crystal layer) through an input-side hemispherical-ended fiber connected to an optical fiber, and the quantity of the light output through an output-side hemispherical-ended fiber was measured with a photodetector, followed by the calculation of a propagation loss. The propagation loss of the optical waveguide was 0.5 dB/cm.

Example 2

1. Production of Composite Substrate for Photonic Crystal Element

The same electro-optical crystal substrate and support substrate as those of Example 1 were prepared. Next, a Mo film (thickness: 0.5 μm) serving as a sacrificial layer was formed on the electro-optical crystal substrate by sputtering. It is said that Mo does not diffuse into the electro-optical crystal substrate (lithium niobate substrate), and hence does not cause the optical deterioration of the electro-optical crystal substrate. Further, the sacrificial layer was patterned by photolithography. Specifically, the portion of the Mo film serving as the sacrificial layer was covered with a resist mask pattern, and the exposed portion thereof was removed with a Mo etchant. Next, silicon oxide was sputtered onto the surface having formed thereon the Mo pattern to form an optical loss-suppressing and cavity-processing layer having a thickness of 1 μm, and CMP polishing was performed to set the arithmetic average roughness Ra of the surface of the layer to 0.3 nm or less. Further, a-Si was sputtered onto the surface of the polished layer to form a joining layer having a thickness of 20 nm, and CMP polishing was performed to set the arithmetic average roughness Ra of the surface of the joining layer to 0.3 nm or less. Next, the surfaces of the joining layer and the support substrate were washed, and then the joining layer and the support substrate were directly joined to each other to integrate the electro-optical crystal substrate and the support substrate with each other. Conditions for the direct joining were the same as those of Example 1. After the joining, polishing was performed until the thickness of the electro-optical crystal substrate became 0.5 μm. Thus, a composite substrate for a photonic crystal element similar to that of FIG. 4 (provided that the joining layer was present between the electro-optical crystal substrate and the support substrate) was obtained. In the resultant composite substrate for a photonic crystal element, a failure such as peeling was not observed at a joining interface.

2. Production of Photonic Crystal Element

A photonic crystal element was produced from the composite substrate for a photonic crystal element obtained in the foregoing by a method corresponding to the production method illustrated in FIGS. 11A to 11C. Specifically, the photonic crystal element was produced by the following procedure. First, hole patterns and through-holes for etching were formed in the same manner as in Example 1. Next, the composite substrate was immersed in a Mo etchant so that the residue of the Mo mask and the sacrificial layer were etched. Thus, a photonic crystal wafer was produced. The resultant photonic crystal wafer was cut into chips in the same manner as in Example 1 to provide the photonic crystal elements. The optical waveguide length of each of the photonic crystal elements was set to 10 mm as in Example 1. After the chip cutting, end surface polishing was performed in the same manner as in Example 1.

The resultant photonic crystal elements (chips) were subjected to the same evaluation as that of Example 1. As a result, cavities were satisfactorily formed directly below the photonic crystal layers of the chips, and the yield of the chips whose cavities were able to be formed as designed was 100%. Further, the propagation loss of the optical waveguide of each of the resultant chips was 0.5 dB/cm.

Example 3

1. Production of Composite Substrate for Photonic Crystal Element

The same electro-optical crystal substrate and support substrate as those of Example 1 were prepared. Next, a Mo film (thickness: 0.215 μm) serving as an optical loss-suppressing layer was formed on the electro-optical crystal substrate by sputtering. Further, the optical loss-suppressing layer was patterned by photolithography. Specifically, the portion of the Mo film serving as the optical loss-suppressing layer was covered with a resist mask pattern, and the exposed portion thereof was removed with a Mo etchant. Next, silicon oxide was sputtered onto the surface having formed thereon the Mo pattern to form a sacrificial layer having a thickness of 0.25 μm, and CMP polishing was performed to set the arithmetic average roughness Ra of the surface of the sacrificial layer to 0.3 nm or less. Next, silicon oxide was sputtered onto the polished surface of the sacrificial layer to form a cavity-processing layer having a thickness of 0.5 μm, and CMP polishing was performed to set the arithmetic average roughness Ra of the surface of the cavity-processing layer to 0.3 nm or less. Further, a-Si was sputtered onto the layer to form a joining layer having a thickness of 20 nm, and CMP polishing was performed to set the arithmetic average roughness Ra of the surface of the joining layer to 0.3 nm or less. The subsequent procedure was the same as that of Example 1. Thus, a composite substrate for a photonic crystal element similar to that of FIG. 9 (provided that the joining layer was present between the electro-optical crystal substrate and the support substrate) was obtained. In the resultant composite substrate for a photonic crystal element, a failure such as peeling was not observed at a joining interface.

2. Production of Photonic Crystal Element

A photonic crystal element was produced from the composite substrate for a photonic crystal element obtained in the foregoing by a method corresponding to the production method illustrated in FIGS. 13A to 13D. Specifically, the photonic crystal element was produced by the following procedure. First, hole patterns and through-holes for etching were formed in the same manner as in Example 1. Next, the composite substrate was immersed in a Mo etchant so that the residue of the Mo mask was etched. Further, the composite substrate was immersed in a BHF etchant so that the sacrificial layer and the cavity-processing layer were removed. Thus, a cavity was formed, and as a result, a photonic crystal wafer was produced. The resultant photonic crystal wafer was cut into chips in the same manner as in Example 1 to provide the photonic crystal elements. The optical waveguide length of each of the photonic crystal elements was set to 10 mm as in Example 1. After the chip cutting, end surface polishing was performed in the same manner as in Example 1.

The resultant photonic crystal elements (chips) were subjected to the same evaluation as that of Example 1. As a result, cavities were satisfactorily formed directly below the photonic crystal layers of the chips, and the yield of the chips whose cavities were able to be formed as designed was 100%. Further, the propagation loss of the optical waveguide of each of the resultant chips was 0.5 dB/cm.

Example 4

A composite substrate for a photonic crystal element was produced in the same manner as in Example 1 except that no through-hole for etching was formed, and a photonic crystal wafer and photonic crystal elements (chips) were produced from the composite substrate. The resultant photonic crystal elements (chips) were subjected to the same evaluation as that of Example 1. As a result, chips in which cavities were not formed directly below photonic crystal layers were found. The yield of the chips whose cavities were able to be formed as designed was about 50%. Further, the propagation loss of the optical waveguide of each of the chips whose cavities were formed was 0.5 dB/cm, but the propagation loss of the optical waveguide of each of the chips whose cavities were not formed was 2 dB/cm or more.

INDUSTRIAL APPLICABILITY

The composite substrate according to the embodiment of the present invention may be suitably used in a photonic crystal element. The photonic crystal element according to the embodiment of the present invention may be suitably used in a wide variety of fields including an optical waveguide, next-generation high-speed communication, a sensor, laser processing, and photovoltaic power generation.

What is claimed is:

1. A composite substrate for a photonic crystal element, comprising:

an electro-optical crystal substrate having an electro-optical effect, wherein the electro-optical crystal substrate comprises lithium niobate ($LiNbO_3$), lithium tantalate ($LiTaO_3$), potassium titanate phosphate ($KTiOPO_4$), potassium lithium niobate ($K_xLi_{(1-x)}NbO_2$), potassium niobate ($KNbO_3$), potassium tantalate niobate ($KNb_xTa_{(1-x)}O_3$), or a solid solution of lithium niobate and lithium tantalate;

an optical loss-suppressing and cavity-processing layer arranged on one surface of the electro-optical crystal substrate, wherein the optical loss-suppressing and cavity-processing layer comprises amorphous silicon (a-Si), polycrystalline silicon, or mixtures thereof; and a support substrate integrated with the electro-optical crystal substrate through the optical loss-suppressing and cavity-processing layer, wherein the optical loss-suppressing and cavity-processing layer and the support substrate are directly joined to each other, and wherein an amorphous layer is formed at a joining interface of the direct joining.

2. The composite substrate for a photonic crystal element according to claim 1, wherein the optical loss-suppressing and cavity-processing layer is a single layer.

3. The composite substrate for a photonic crystal element according to claim 2, further comprising a peeling-preventing layer between the electro-optical crystal substrate and the optical loss-suppressing and cavity-processing layer.

4. The composite substrate for a photonic crystal element according to claim 2, further comprising a joining layer between the optical loss-suppressing and cavity-processing layer and the support substrate.

5. The composite substrate for a photonic crystal element according to claim 2, further comprising a patterned sacrificial layer formed in the optical loss-suppressing and cavity-processing layer.

6. The composite substrate for a photonic crystal element according to claim 2, further comprising an overcoat layer between the optical loss-suppressing and cavity-processing layer and the support substrate.

7. The composite substrate for a photonic crystal element according to claim 1, wherein the optical loss-suppressing and cavity-processing layer includes an optical loss-suppressing layer arranged on the electro-optical crystal substrate and a cavity-processing layer arranged on the support substrate, and the optical loss-suppressing layer and the cavity-processing layer are directly joined to each other.

8. The composite substrate for a photonic crystal element according to claim 7, further comprising a joining layer between the optical loss-suppressing layer and the support substrate.

9. The composite substrate for a photonic crystal element according to claim 7, further comprising a patterned sacrificial layer formed in the optical loss-suppressing layer or the cavity-processing layer.

10. The composite substrate for a photonic crystal element according to claim 7, further comprising an overcoat layer between the optical loss-suppressing layer and the cavity-processing layer.

11. A photonic crystal element, comprising:

a photonic crystal layer obtained by periodically forming holes in an electro-optical crystal substrate, wherein the electro-optical crystal substrate comprises lithium niobate ($LiNbO_3$), lithium tantalate ($LiTaO_3$), potassium titanate phosphate ($KTiOPO_4$), potassium lithium niobate ($K_xLi_{(1-x)}NbO_2$), potassium niobate ($KNO_3$), potassium tantalate niobate ($KNb_xTa_{(1-x)}O_3$), or a solid solution of lithium niobate and lithium tantalate;

a joining portion arranged below the photonic crystal layer, the joining portion being configured to integrate the photonic crystal layer and a support substrate with each other, wherein the joining portion comprises amorphous silicon (a-Si), polycrystalline silicon, or mixtures thereof; and a cavity defined by a lower surface of the photonic crystal layer, an upper surface of the support substrate, and the joining portion, wherein the joining portion and the support substrate are directly joined to each other, and wherein an amorphous layer is formed at a joining interface of the direct joining.

12. A photonic crystal element using the composite substrate for a photonic crystal element of claim 1, the photonic crystal element comprising:

a photonic crystal layer obtained by periodically forming holes in the electro-optical crystal substrate;

a joining portion arranged below the photonic crystal layer, the joining portion being configured to integrate the photonic crystal layer and the support substrate with each other; and a cavity defined by a lower surface of the photonic crystal layer, an upper surface of the support substrate, and the joining portion.

13. The photonic crystal element according to claim 11, wherein the photonic crystal layer has formed therein a through-hole for etching.

14. The photonic crystal element according to claim 13, wherein the through-hole for etching has a size larger than a size of each of the holes.

* * * * *